United States Patent [19]

Van Ginkel et al.

[11] 3,781,834

[45] Dec. 25, 1973

[54] REDUCTION CROSS-TALK IN DOUBLE GAP HEAD

[75] Inventors: Johannes Van Ginkel; Teunis Robert Van Heelsbergen, both of Emmasingel, Eindhoven, Netherlands

[73] Assignee: U.S. Philips Corporation, New York, N.Y.

[22] Filed: Aug. 16, 1972

[21] Appl. No.: 281,123

[30] Foreign Application Priority Data

Aug. 21, 1971 Netherlands ........................ 7111554

[52] U.S. Cl. .......................................... 340/174.1 F

[51] Int. Cl. .......................................... G11b 5/28

[58] Field of Search .............................. 346/74 MC; 179/100.2 C; 340/174.1 B, 174.1 F

[56] References Cited

UNITED STATES PATENTS

| | | | |
|---|---|---|---|
| 3,603,941 | 9/1971 | Koorneet | 340/174.1 F |
| 3,432,839 | 3/1969 | Strapper | 340/174.1 F |
| 3,479,662 | 11/1969 | Bradford et al. | 340/174.1 F |

*Primary Examiner*—Vincent P. Canney
*Attorney*—Frank R. Trifari

[57] ABSTRACT

A double gap magnetic head comprising at least one writing head and at least one reading head arranged behind the writing head in the direction of travel of the tape for writing and immediately thereafter reading information, in particular digital information, in which, to reduce the cross-talk, the writing winding is provided on one limb of the writing head and the reading winding is provided on one limb of the reading head asymmetrically relative to the central member separating the writing head and the reading head.

4 Claims, 2 Drawing Figures

REDUCTION CROSS-TALK IN DOUBLE GAP HEAD

Figures 1, 2:
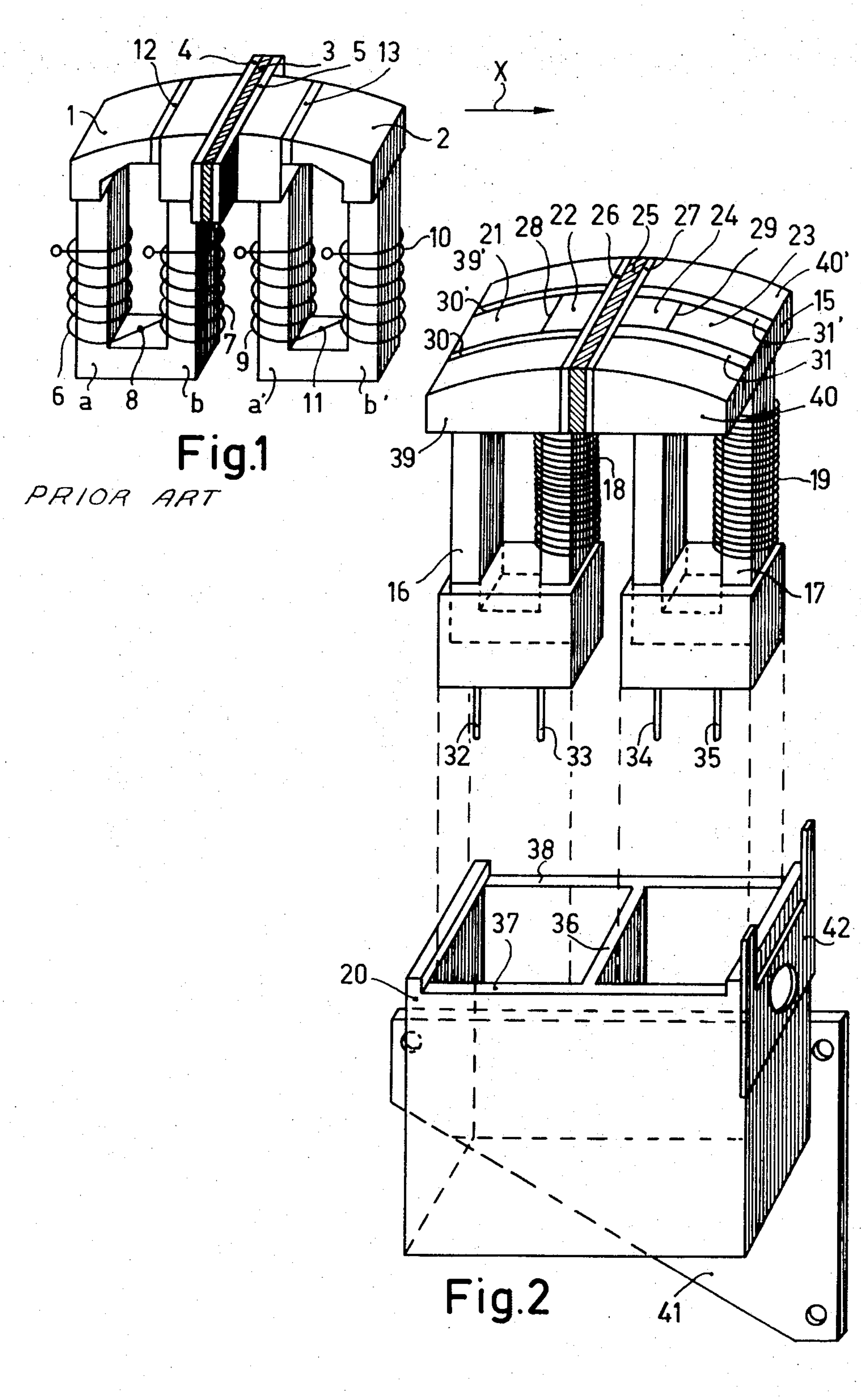

The invention relates to a double gap magnetic head comprising at least one writing head which is provided with one or more writing windings and at least one reading head which is provided with one or more reading windings and is arranged behind the writing head in the direction of movement of a magnetic record carrier to be conveyed along the magnetic head, the reading head and the writing head being arranged on either side of a central member which comprises at least a plate of a magnetically readily conducting material.

In magnetic recording systems which are coupled to computers and which use magnetic heads to write and read a magnetic record carrier, for example, a magnetic tape, disc, or drum, so-called double gap magnetic heads are often used which comprise at least one writing element or writing head and at least one reading head or reading element for writing and immediately thereafter reading information on the magnetisable medium. In a conventional digital recording system such a double gap magnetic head may comprise, for example, a number of writing heads each having a writing gap for magnetizing the medium in accordance with information supplied to the energisation circuit of the relevant head. These heads are positioned beside each other transverse to the direction of movement of the magnetisable medium so as to write information in a number of tracks which extend mutually in parallel. In addition, the same number of juxtaposed reading heads is present having reading gaps to read the information written in the tracks. The reading and writing heads are arranged behind each other in the direction of movement of the medium and the reading heads operate simultaneously with the writing heads to check the recorded information and/or to pass information to the exterior.

In the present day high-speed recording systems operating with high information densities the respective wiritng and reading heads are arranged very close together; characterizing in this respect is that the distance between the writing and reading gap in a certain type of double gap head is only 3.8 mm so that there is a considerable extent of mutual influencing. Actually, during recording, an electromagnetic field is produced by the electric winding of the writing head and is detected by the reading circuit. In some cases, such a cross-talk signal can even drown the information signal as a result of which reliable reading becomes impossible.

The above-described problem of writing-reading cross-talk is known and various methods to reduce said cross-talk have already been proposed. A considerable reduction is achieved by providing the writing and reading head on either side of a central member which comprises at least one plate of a magnetically readily conducting material to create a conduction path for the stray flux. See, for example the British Patent Specification No. 1,024,987.

It is the object of the present invention to further reduce the writing-reading cross-talk in a double gap magnetic head as described above. For that purpose, a double gap magnetic head according to the invention is characterized in that the writing winding is provided on one limb of the writing head and the reading winding is provided on one limb of the reading head asymmetrically relative to the central member.

In double gap magnetic heads it has so far been usual that the electric windings of the writing and reading heads either are both provided only on the outer limb, or are both provided only on the inner limb or are both distributed over the inner and outer limb of the relevant head. This means that the electric windings of the writing and the reading head have so far always been provided symmetrically relative to the central member.

It has surprisingly been found that the writing-reading cross-talk can be considerably smaller than that in the above-mentioned configurations of windings, when according to the invention the winding configuration of the writing head and the winding configuration of the reading head are provided asymmetrically relative to the central member.

The reduction of the writing-reading cross-talk is found to be particularly favourable when, according to an embodiment of the magnetic head according to the invention one writing winding is provided on one limb of the writing head and one reading winding is provided on one limb of the reading head.

It is found that a maximum reduction of the writing-reading cross-talk can be achieved when, according to a further embodiment of the magnetic head according to the invention, the reading head and the writing head are each surrounded by a screening of a magnetically readily conducting but electrically poorly conducting material, said screening extending parallel to the limbs of the heads, adjoining the magnetically readily conducting plate of the central member, and continuing to the front face.

The invention will be described in greater detail by way of example with reference to the drawing, in which FIG. 1 shows a known construction of a double gap magnetic head, and in which FIG. 2 shows a double gap magnetic head according to the invention.

A number of experiments have been performed on the known double gap magnetic head shown in FIG. 1 which comprises one writing head 1 and one reading head 2. A magnetic tape not shown should be passed over the head in the direction $x$. The writing and the reading head are both manufactured from ferrite and mounted on either side of a central member which consists of a plate of ferrite 3 flanked by plates 4, 5 of magnetically non-conducting ceramic material.

Electric windings 6 and 7, respectively, are provided on each limb $a$ and $b$, respectively, of the writing head 1, the number of turns of the two windings being the same. In the writing process the windings can be energized simultaneously (in series) or separately by means of the center tap 8. Electric windings 9 and 10, respectively, are also provided on each limb $a'$ and $b'$, respectively, of the reading head, the number of turns of the two windings being also the same. In the reading process a signal can be derived either from each of the windings separately by means of the central tapping 11, or from the series arranged windings collectively. For illustration, the thickness of the plate 3 is 0.5 mm the parts of both the writing head 1 and the reading head 2 adjoining the central member have a dimension in the direction of travel of the tape of 1 mm, the parts of both the writing head 1 and the reading head 2 farthest remote from the central member have a dimension in the direction of travel of the tape of 3 mm, and the distance from the writing gap 12 to the reading gap 13 is 3.8 mm. The test conditions were:

Frequency writing signal: 3 kHz.

Writing current: 10 or 20 mA. (Dependent on whether 1 or 2 windings were energized).

Rise/Decay time: 50 $\mu$ sec.

The measured results shown in table 1 were obtained, in which reference is made to FIG. 1 for the winding configurations and in which it is to be noted that always the relative cross-talk is stated, that is to say the cross-talk compared with the cross-talk which is measured on a head in which the writing signal is supplied to the series-arranged writing windings and in which the reading signal is derived from the series-arranged reading windings. The measurements have been corrected for the difference in the number of turns.

TABLE I

| Writing | | Reading | | | | |
|---|---|---|---|---|---|---|
| | writing current mA | winding on limb a | winding on limb b | winding on limb a' | winding on limb b' | relative cross-talk % |
| 1. | 10 | x | x | x | x | 100 |
| 2. | 20 | | x | x | x | 108 |
| 3 | 20 | x | | x | x | 108 |
| 4 | 20 | x | | | x | 166 |
| 5 | 20 | x | | x | | 48 |
| 6 | 20 | | x | x | | 184 |
| 7 | 20 | | x | | x | 32 |
| 8 | 10 | x | x | x | | 212 |
| 9 | 10 | x | x | | x | 134 |

In the head used for the tests the reading circuit was shielded in the conventional manner from the writing circuit by means of $\mu$ metal plates. In the relevant case an H-shaped configuration of screenings was used with the connection limb of the H being between the writing head 1 and the reading head 2 in alignment with plate 3.

A second series of tests was performed on the same head as described above, but a double sheath 20 of ferrite as shown in FIG. 2 was used instead of a $\mu$ metal screening.

The measured results are shown in Table II.

TABLE II

| Writing | | Reading | | | | |
|---|---|---|---|---|---|---|
| | writing current (mA) | winding on limb a | winding on limb b | winding on limb a' | winding on limb b' | relative cross-talk % |
| 1. | 10 | x | x | x | x | 100 |
| 2. | 20 | | x | x | x | 151 |
| 3. | 20 | x | | x | x | 42 |
| 4. | 20 | x | | | x | 98 |
| 5. | 20 | x | | x | | 9 |
| 6. | 20 | | x | x | | 360 |
| 7. | 20 | | x | | x | 36 |
| 8. | 10 | x | x | x | | 196 |
| 9. | 10 | x | x | | x | 36 |

It appears from the Tables that compared with case 1, the cross-talk is smallest in cases 5, 7 and 9.

FIG. 2 shows the components of a double gap magnetic head with the winding configuration according to the invention prior to assembly.

The head consists of a front member 15, two rear yokes 16 and 17 and a screening 20 which is constituted by a double sheath of ferrite which also constitutes the housing.

The front member 15 is formed by two asymmetric circuit parts 21 ans 22 of ferrite which together with the rear yoke 16 form the magnetic circuit of the writing head, by two asymmetric circuit parts 23 and 24 of ferrite which, together with the rear yoke 17, constitute the magnetic circuit of the reading head, and by a central member which consists of a central plate 25 of ferrite and is flanked by two plates 26 and 27, respectively, of a non-magnetic ceramic material. All these components are rigidly cemented together, the cementing between the parts 21 and 22 constituting the writing gap 28 and the cementing between the parts 23 and 24 constituting the reading gap 29. Plates of non-magnetic ceramic construction material 30, 30' and 31, 31' are furthermore present on the long sides of the circuit parts.

The rear yokes 16 and 17 also consist of ferrite, while in accordance with the invention an electric winding 18 is provided on the inner limb of the rear yoke 16 and an electric winding 19 is provided on the outer limb of the rear yoke 17. The ends of the respective windings can be secured to connection pins 32, 33 and 34, 35, respectively.

On assembling, the rear yokes 16 and 17 are cemented in place against the face member 15 and the assembly is inserted into the ferrite sheath 20 to which a connection plate 41 and a tape guide 42 are secured. The central member 36 of the sheath engages the ferrite plate 25 of the face member and the side walls 37 and 38 engage the ferrite parts 39, 39' and 40, 40' of the front member which in this manner also constitute the screening.

It has now been found that the reduction in cross-talk which is achieved with the arrangement of the electric winding 6 described above is strongly dependent upon the correct position of the combination of front member with rear yokes relative to the screening 20.

A position in which the cross-talk is minimum can be found by relatively sliding the screening 20 — before the combination of the front member with rear yokes is cemented therein — and said combination in the direction of travel of the tape.

It has been found that the relative cross-talk measured in table II sub 5, 7 and 9 can thus be reduced to a minimum value 2, corresponding to an absolute cross-talk signal of less than 0.1 mV.

What is claimed is:

1. A double gap magnetic head comprising at least one writing head which is provided with one or more writing windings and at least one reading head which is provided with one or more reading windings and is arranged behind the writing head in the direction of movement of a magnetic record carrier to be conveyed along the magnetic head, the reading head and the writing head being arranged on either side of a central member which comprises at least a plate of a magnetically readily conducting material, characterized in that the winding configuration of the writing head and the winding configuration of the reading head are provided asymmetrically relative to the central member.

2. A magnetic head as claimed in claim 1, characterized in that one writing winding is provided on one limb of the writing head and one reading winding is provided on one limb of the reading head.

3. A magnetic head as claimed in claim 1, characterized in that the reading head and the writing head are each surrounded by a screening of a magnetically readily conducting but electrically poorly conducting material said screening extending parallel to the limbs of the heads, continuing up to the contact face with the tape and adjoining the magnetically readily conducting plate of the central member.

4. A magnetic head as claimed in claim 3, wherein one writing winding is provided on one limb of the writing head and one reading winding is provided on one limb of the reading head.

* * * * *